(12) United States Patent
Smith

(10) Patent No.: US 6,565,039 B2
(45) Date of Patent: May 20, 2003

(54) WING-DRIVE MECHANISM AND VEHICLE EMPLOYING SAME

(76) Inventor: Michael J. C. Smith, 5781 Marblewood Ct., Jupiter, FL (US) 33458

(*) Notice: Subject to any disclaimer, the term of this patent is extended or adjusted under 35 U.S.C. 154(b) by 0 days.

(21) Appl. No.: 10/101,338

(22) Filed: Mar. 18, 2002

(65) Prior Publication Data

US 2002/0130218 A1 Sep. 19, 2002

Related U.S. Application Data

(60) Provisional application No. 60/277,356, filed on Mar. 19, 2001.

(51) Int. Cl.[7] ............................................. B64C 33/02
(52) U.S. Cl. ..................................................... 244/72
(58) Field of Search ........................... 244/11, 22, 72; 446/39, 317; 490/32, 21, 13; 416/74, 75, 83

(56) References Cited

U.S. PATENT DOCUMENTS

| | | | |
|---|---|---|---|
| 4,139,171 A | 2/1979 | Harris | 244/22 |
| 4,718,877 A | 1/1988 | Girsch et al. | 446/313 |
| 4,729,748 A | 3/1988 | Van Ruymbeke | 446/35 |
| 4,749,149 A | 6/1988 | Gruich | 244/22 |
| 4,793,573 A | 12/1988 | Kelfer | 244/11 |
| 5,163,861 A | 11/1992 | Van Ruymbeke | 446/35 |
| 5,899,408 A | 5/1999 | Bowers, Jr. | 244/11 |
| 6,206,324 B1 | 3/2001 | Smith | 244/72 |

FOREIGN PATENT DOCUMENTS

| | | | |
|---|---|---|---|
| WO | 01/15971 | 3/2001 | B64C/33/02 |

OTHER PUBLICATIONS

Michael J. C. Smith, "Simulating Flapping Insect Wings...", Ph.D. Thesis, Purdue University, May 25, 1995.

Michael J. C. Smith, "Reinstating Inquiry into Mechanized Flapping–Wing Flight...", AIAA 97–0533, 35th Aerospace Sciences Meeting and Exhibit, Jan. 6–10, 1997.

Smith et al., "The Advantages of an Unsteady Panel Method in Modeling...", J. Experimental Biology 199, 1073–1083 (1996).

Michael J. C. Smith, "Simulating Moth Wing Aerodynamics: Towards the Develoment of Flapping–Wing Technology", AIAA Journal 34:1348–1355 (1996).

(List continued on next page.)

*Primary Examiner*—Galen L. Barefoot
(74) *Attorney, Agent, or Firm*—Gary C.Cohn PLLC

(57) ABSTRACT

A wing-drive mechanism is described that permits, with proper control, movement of a wing about multiple wing trajectories. The wing-drive is capable of independent movement about three rotational degrees of movement; movement about a flap axis is independent of movement about a yaw axis, and both are independent of changes in the pitch of the wing. Methods of controlling the wing-drive mechanism to affect a desired wing trajectory include the use of a non-linear automated controller that generates input signals to the wing-drive mechanism by comparing actual and desired wing trajectories in real time. Specification of wing trajectories is preferably also accomplished in real time using an automated trajectory specification system, which can include a fuzzy logic processor or a neural network.

12 Claims, 1 Drawing Sheet

OTHER PUBLICATIONS

DeLaurier and Harris, "A Study of Mechanical Flapping–Wing Flight", Aeronautical Journal, Oct. 1993.

Hargrave's Flying Machine, The American Engineer, May 1893, pp 233–234.

Michael J. C. Smith, "Trajectory Control of Flapping Wings: . . .", 6th AIAA/NASA/USAF Multidisciplinary Analysis and Optimization Symposium, Sep. 4–6, 1996.

U.S. patent application Ser. No. 09/793,333, Smith, filed Feb. 26, 2001.

"Spencer's Ornithopter", Model Airplane News, Feb. 1999, pp. 40–43, 45.

Hollingum, "Military to look to flying insect robots", Industrial Robot, 25:123–128 (1998).

Michelson, "Update on Flapping Wing Micro Air Vehicle Research", 13th Bristol International RPV Conference, Mar. 30–Apr. 1, 1998.

"Tiny Drones May Be Soldier's New Tool", Aviation Week & Space Technology, Jun. 8, 1998, pp. 42–48.

"Honey, I Shrunk the Plane", Machine Design, Oct. 8, 1998 pp. 353–348.

"Several Micro Air Vehicles In Flight Test Programs", Aviation Week & Space Technology, Jul. 12, 1999, pp. 47–48.

"Quetzalcoatl", Model Aviation, Aug. 1986, pp. 84–90, 158.

"Microplanes", Popular Science, Jan. 1998, pp. 54–59.

Michael J. C. Smith, "Leading Edge Effects on Moth Wing Aerodynamics, . . .", 14th AIAA Applied Aerodynamics Conference, Jun. 17–20, 1996.

"Learning From the Birds and Bees", I. D. Magazine, Nov. 1998, pp. 66–69.

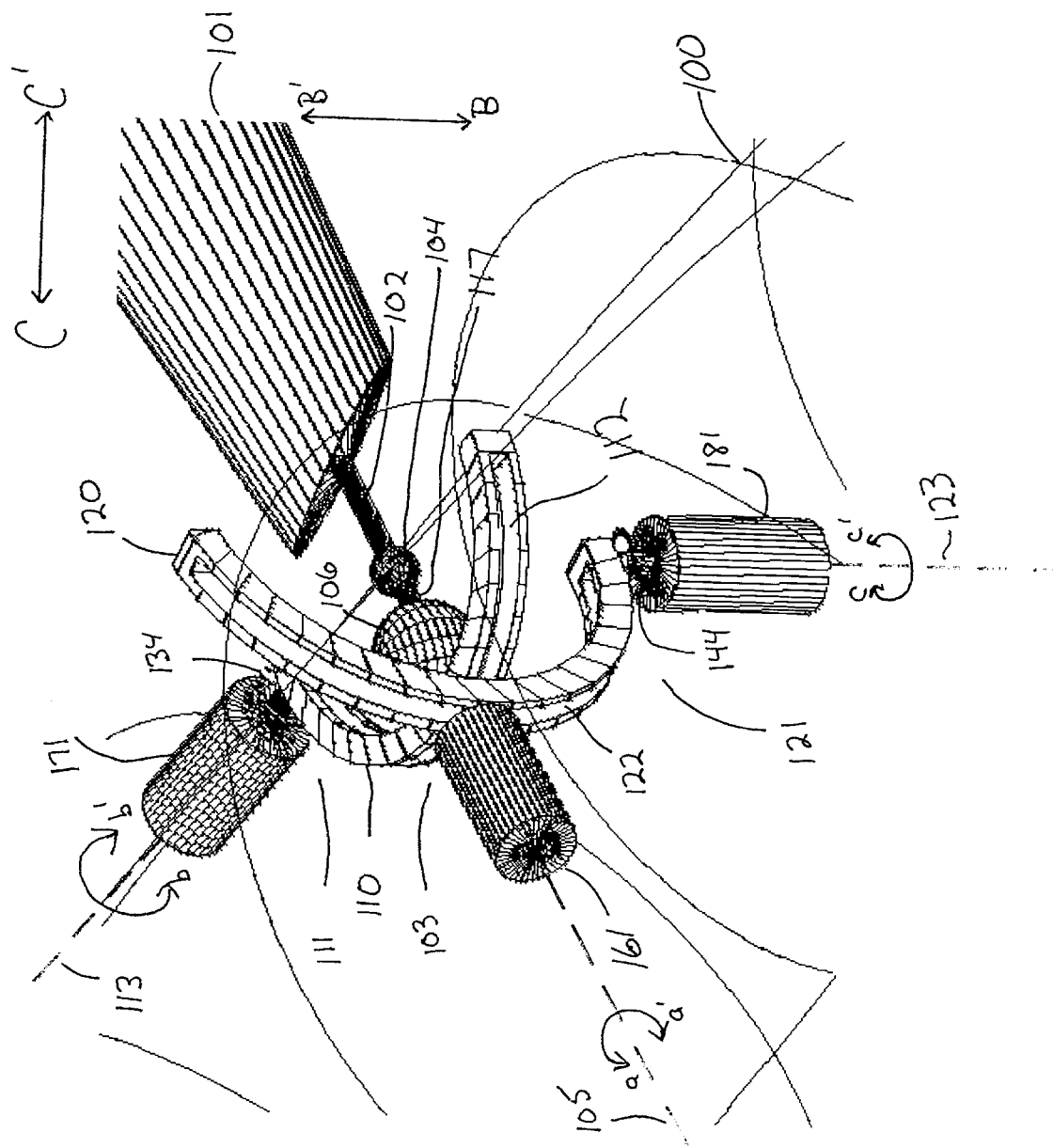

WING-DRIVE MECHANISM AND VEHICLE EMPLOYING SAME

CROSS-REFERENCE TO RELATED APPLICATION

This application claims benefit of U.S. provisional application No. 60/277,356, filed Mar. 19, 2001.

BACKGROUND OF THE INVENTION

This invention relates to vehicles that derive motion from one or more flapping wings.

One approach to heavier-than-air flight employs flapping wings to generate a combined lift-thrust force. In principle, flapping wing technology offers the possibility of creating versatile flight vehicles that can combine and in some cases exceed the performance advantages of fixed-wing and rotary-wing technologies. In particular, flapping wing technology offers the possibility of providing improved maneuverability compared to even rotary-wing technologies. Vehicles employing flapping wing technologies are referred to as "ornithopters".

Unfortunately, very few ornithopters have succeeded in flying. In 1929, Lippisch developed a human-powered ornithopter that achieved non-sustained flight. In 1986, Mac-Cready et al. developed an ornithopter modeled on a pterosaur, an extinct flying reptile. That ornithopter was winch launched and could not sustain flight for an extended duration. More recently, Harris and DeLaurier developed an ornithopter that was capable of sustained flight. In addition, various toys have been developed that employ flapping wing technology to fly, including that described in U.S. Pat. No. 4,729,728 to Van Ruymbeke.

Unfortunately, even those previous ornithopters that were capable of flight were very limited in their maneuverability. These ornithopters operated by flapping wings only in a single trajectory, i.e., in an up and down motion. Thus, the aerodynamic force developed by the flapping wings over the course of a series of "beats" was fixed in a fixed (relative to the vehicle), substantially vertical plane. To develop lift, these ornithopters mimicked conventional fixed wing aircraft in that in all cases lift was achieved by creating airflow past an airfoil due to the forward motion of the vehicle as a whole. Thus, these ornithopters suffered from the same maneuverability limitations as conventional fixed-wing aircraft.

In an analogous way, conventional and submersible watercraft, spacecraft and satellites also are limited in their maneuverability due to the design of their propulsion systems.

In U.S. Pat. No. 6,206,324, U.S. patent application Ser. No. 09/793,333 and PCT/US00/23544, all to Michael J. C. Smith, a wing-drive mechanism is described, together with methods for controlling the wing-drive mechanism to effect flight. The wing-drive mechanism described in the patents and the applications is capable of independent movement about flap, pitch and yaw axes through the operation of three axis drive mechanisms.

It is desirable to provide a wing-drive that operates smoothly and efficiently, and which preferably is light in weight.

BRIEF DESCRIPTION OF THE DRAWINGS

The FIGURE is an isometric view of an embodiment of this invention.

SUMMARY OF THE INVENTION

In one aspect, this invention is a wing-drive mechanism for a vehicle having a fuselage, comprising a) an outwardly extending spar that is rotatable independently in flap, yaw and pitch directions about a pivot point;

b) an inwardly extending spar that is rotatable independently in flap, yaw and pitch directions about the pivot point, c) a drive wing mounted on the outwardly extending spar;

d) a first axis drive mechanism for moving said drive wing about the pivot point in a flap direction in response to a first movement input signal;

e) a second axis drive mechanism for moving said drive wing about the pivot point in a yaw direction in response to a second movement input signal, wherein said second axis drive mechanism operates independently of said first axis drive mechanism; and f) a third axis drive mechanism for adjusting the pitch of said drive wing in response to a third movement input signal, wherein said third axis drive mechanism operates independently of said first and second axis drive mechanisms, wherein at least one of the first and second axis drive mechanisms act on the inwardly extending spar to effect movement of the inwardly extending spar, the outwardly extending spar and the drive wing about the pivot point.

The wing-drive mechanism of this invention is capable of particularly smooth and accurate operation, can be quite light in weight if desired, and is of simple construction. Because the wing-drive mechanism of this invention is capable of independent movement in three degrees of rotation, it can with proper control be operated to move over multiple trajectories. Multiple, arbitrary wing trajectories can be produced by varying the relative operation of the three axis drive mechanisms, thereby permitting the drive-wing to generate, over the course of a "beat" or series of beats, a net force vector that can have varying magnitudes and directions relative to the orientation of the fuselage in space.

The wing-drive mechanism of this invention also allows for the development of vehicles having two or more independently operated drive wings; i.e. the trajectory of one drive wing can be specified arbitrarily with respect to the trajectory of another drive wing. By operating independently in this fashion, the forces generated by each drive wing can be combined in various ways to maneuver the vehicle. As discussed below, the wing-drive mechanism of this invention most preferably operates independently of the orientation of the fuselage in inertial space, i.e. the ability of the wing-drive mechanism to affect a certain trajectory relative to an inertial frame of reference is not conditioned on the vehicle occupying a unique orientation in space. This can provide yet further refinements in maneuverability and control.

Unless the context requires a narrow meaning, the terms "wing" or "drive wing" are used herein broadly to mean any wing, aileron, stabilizer, rudder, paddle or other propulsion and/or steering device that is moved through a trajectory by the wing-drive mechanism of the invention. "Fuselage" is used herein as shorthand for any host body to which the wing-drive mechanism is affixed.

DETAILED DESCRIPTION OF THE INVENTION

In this invention, a vehicle has one or more movable drive wings that are attached directly or indirectly to a fuselage. The vehicle can be, for example, a flying vehicle such as an ornithopter, a watercraft such as a submersible or a boat, a spacecraft or a satellite. As used herein, the term "fuselage" refers to a structure to which the drive wings are attached, and in relation to which the drive wings move during a beat cycle. The "fuselage" can have any arbitrary shape, size and orientation, and may optionally include one or more platforms or enclosed spaces for carrying operational systems, cargo and/or passengers. Wings and drive wings for flying vehicles are of particular interest.

In the context of this application, "drive wing" means an appendage attached directly or indirectly to the fuselage of the vehicle, and which moves relative to the fuselage to create a force that imparts motion or navigational control (or both) to the vehicle in a predetermined direction. In the case of an aircraft, the drive wing can take the form of, e.g., a fixed wing, rotary wing, airfoil, rudder, stabilizer, elevator, aileron, leg, or landing gear. In the case of a watercraft, the drive wing can take the form of, e.g., a rudder, propulsion device, tail (analogous to the tail of a fish or aquatic mammal) or fin (again analogous to a fish or aquatic mammal). In the case of a spacecraft or satellite, the drive wing can be adapted to provide an inertial control system, or to provide mass balancing.

The wing-drive mechanism of the invention is characterized in that the drive wing can move simultaneously and independently in three rotational degrees of freedom relative to the fuselage, as described more fully hereinafter. For each drive wing, there are independent axis drive mechanisms for moving the drive wing about a flap axis and a yaw axis. There is another independent axis drive mechanism for changing the pitch of the drive wing. In this context, the axis drive mechanisms are said to operate "independently" if the motion imparted to the drive wing by each individual axis drive mechanism can be specified arbitrarily with respect to the motions imparted to the drive wing by the other axis drive mechanisms.

In this invention, at least one of the first and second axis drive mechanisms, preferably the first axis drive mechanism, and more preferably both, effect movement of the drive wing by effecting motion of the inwardly extending spar.

The flap and yaw axes are advantageously fixed with respect to the orientation of the fuselage. Provided that the yaw and flap axes are not coincident or parallel, they can have any relative orientation that allows for the drive wing to move up-and-down relative to an inertial frame of reference, backward-and-forward (or side-by-side) relative to the fuselage, and in any combination of up-and-down and backward-and-forward (or side to side). Note that the descriptors "flap" and "yaw" are arbitrary, as are the orientation of the "yaw" and "flap" axes relative to the fuselage. For design purposes, however, the "flap" axis is preferably substantially horizontal (for example +/- up to about 45° from horizontal) and the "yaw" axis is preferably substantially vertical (for example +/- up to about 45° from vertical) when the fuselage is in a nominally "ordinary" orientation during flight. It is not necessary that the flap and yaw axes be perpendicular to each other, although an angle of from about 45–90° is preferred, an angle of about 60–90° is more preferred and an angle of about 90° is most preferred. In the embodiment shown in the FIGURE, the flap axis is substantially horizontal and parallel with the nominal front-to-rear orientation of fuselage 100 (shown in outline), and the yaw axis is substantially vertical and perpendicular to the front-to-rear orientation of fuselage 100.

The FIGURE illustrates an embodiment of a wing-drive mechanism according to the invention, in which both the first and second axis drive mechanisms move the drive wing by acting on an inwardly extending spar. Drive wing 101 is affixed to outwardly extending spar 102. Outwardly extending spar 102 is rotatable about pivot point 104 in flap, yaw and pitch directions. The wing-drive mechanism is affixed to fuselage 100 through pivot point 104 in such a way that outwardly extending spar 102 and inwardly extending spar 117 can each move independently in flap, yaw and pitch directions. As shown, pivot point 104 is in the form of a ball; a corresponding socket-type holder affixed to the fuselage permits the spar to move in the required manner. However, any means of affixing the wing-drive mechanism directly or indirectly to the fuselage so that inwardly extending spar 117 and outwardly extending spar can move about pivot point 104 can be used.

Inwardly extending spar 117 is similarly rotatable about pivot point 104.

Note that the use of the term "spar" in this application is not intended to specify any particular shape or configuration. The inwardly extending spar is simply a member that is connected to the pivot point and is in communication with the axis drive mechanisms so that actuation of one or more of the axis drive mechanisms effects rotation of outwardly extending spar about the pivot point. Similarly, the outwardly extending spar is simply a member that is connected to the pivot point and to the drive wing so that movement of the inwardly extending spar by one or more of the axis drive mechanisms effects rotation of the drive wing about the pivot point. The inwardly extending spar and outwardly extending spar may be formed as a single piece if desired. The outwardly extending spar may be integrally formed into the drive wing. Either may be of any shape and size that permits it to perform the functions described herein.

Axis drive mechanisms 103, 111 and 121 interact with inwardly extending spar to rotate it in pitch, flap and yaw directions, respectively. This in turn causes corresponding pitch, flap and yaw movements of outwardly extending spar 102 and drive wing 101. As shown, third axis drive mechanism 103 consists of motor 161 that is affixed to inwardly extending spar 117. Motor 161 is slotted onto guide rail 120 in such a way that (1) motor 161 can move freely along slot 122, (2) motor 161 is rotationally fixed with respect to guide rail 120, and (3) inwardly extending spar 117 (which forms or is affixed to the shaft of motor 161) can rotate freely with respect to guide rail 120. When activated, motor 161 rotates inwardly extending spar 117 about pitch axis 105 in the direction indicated by the double-headed arrow a–a'. Rotation about pitch axis 105 results in rotation of outwardly extending spar 102 and, correspondingly, a variation of the pitch of drive wing 101.

A flap motion is imparted to drive wing 101 via first axis drive mechanism 111. First axis drive mechanism 111 provides torque to inwardly extending spar 117 about flap axis 113. In the embodiment shown, torque is transferred to inwardly extending spar 117 via guide rail 110. As shown, guide rail 110 is in the form of a slotted arc, and inwardly extending spar 117 is inserted through slot 112 of guide rail 110. First axis drive mechanism 111 is adapted to apply torque to guide rail 110, thereby rotating guide rail 110 and inwardly extending spar 117 about flap axis 113 to impart an oscillating flap motion to outwardly extending spar 102 and drive wing 101. The orientation of flap axis 113 is fixed in space with respect to fuselage 100 by virtue of first axis drive mechanism 111 being affixed directly or indirectly to fuselage 100. The direction of rotation imparted by first axis drive mechanism 111 to guide rail 110 is shown by double-headed arrow b–b'. A clockwise rotation (as seen facing the "rear" of the fuselage) is arbitrarily designated as "positive", and the opposite rotation is arbitrarily designated as "negative". The direction of flap motion imparted to drive wing 101 is shown by double-headed arrow B–B'.

A yaw motion is imparted to drive wing 101 via second axis drive mechanism 121. Second axis drive mechanism 121 provides torque to inwardly extending spar 117 about yaw axis 123. In the embodiment shown, torque is transferred to inwardly extending spar 117 via guide rail 120. As shown, guide rail 120 is in the form of a slotted arc, and inwardly extending spar 117 is inserted through slot 122 of guide rail 120. In this embodiment the radius of curvature of guide rail 120 is larger than that of guide rail 110, so that the two guide rails can move freely and independently with respect to each other. The direction of rotation imparted by second axis drive mechanism 121 to guide rail 120 is shown by double-headed arrow c–c'. Second axis drive mechanism 121 is adapted to apply torque to guide rail 120, thereby rotating guide rail 120 and inwardly extending spar 117 about flap axis 123 to impart an oscillating flap motion to outwardly extending spar 102 and drive wing 101. A clockwise rotation (as seen facing "upward" through the fuselage) is arbitrarily designated as "positive", and the opposite rotation is arbitrarily designated as "negative". The direction of yaw motion imparted to drive wing 101 is shown by double-headed arrow C–C'.

In the FIGURE, optional mass balance 106 is affixed to inwardly extending spar 117 to offset the mass of wing 101 and outwardly extending spar 102, so as to improve operation, improve balance, and to reduce the energy needed to operate the wing-drive mechanism.

Axis drive mechanisms 103, 111 and 121 affect movement of drive wing 101 by providing torque indirectly to outwardly extending spar 102 about the pitch, flap and yaw axes. In response to a movement input signal, each of axis drive mechanisms 103, 111 and 121 (1) transfer torque to drive wing 101 (2) independently of the operation of the other axis drive mechanisms. As such, axis drive mechanisms 103, 111 and 121 each include means for receiving a movement input signal and applying torque in response thereto, as well as coupling apparatus for transferring the torque to spar 102. Axis drive mechanisms 103, 111 and 121 also include or are coupled to a source of mechanical power such as a motor. It will be readily appreciated that a great many variations in the designs and configurations of the axis drive mechanisms are possible.

In the embodiment shown in the FIGURE, mechanical power is supplied to axis drive mechanisms 103, 111 and 121 by motors 161, 171 and 181, respectively. Such motors can be of any type, including but not limited to internal combustion engines, pneumatic motors, steam engines, hydraulic motors, electrical motors and hybrid electrical motors. Electrical motors are preferred, as the use of an electrical motor for mechanical power greatly facilitates the creation of complex torque sequences over the course of a beat cycle. Electrical motors that operate bi-directionally are especially preferred as such motors tend to be light weight and offer the possibility of controlling the magnitude and direction of the applied torque through variations in the electrical power supply to the motor.

Piezoelectric actuators can be used to supplement or replace the aforementioned motors. These actuators include a material, commonly a ceramic material such as lead titanate, lead zirconate titanate, lead magnesium niobate, lead metaniobate, lead zirconate and the like that become reversibly distorted in a predetermined direction when an electric current is applied. Piezoelectric actuators are well known and commercially available. Actuators such as BM1110-400, BM1110-532, BM1120-400, BM1120-532, BM1125-400 and BM1125-532, all sold by Sensor Technology, Ltd., Ontario Canada, are suitable.

Although each axis drive mechanism shown in The FIGURE has its own source of mechanical power, it is possible through appropriate linkages for two or more axis drive mechanisms to share a single mechanical power source.

Axis drive mechanisms 103, 111 and 121 also contain connections to fuel or power supplies. If an axis drive mechanism does not contain a dedicated source of mechanical power, it is coupled to one. Suitable power supplies include fossil fuels, compressed gasses, steam, batteries, hydrogen fuel cells, solar panels, generators or combinations of these.

The combined operations of axis drive mechanisms 103, 111 and 121 move drive wing 101 through its trajectory. The trajectory produced through the combined operations of axis drive mechanisms 103, 111 and 121 can be altered through changes in the frequency, sequencing, phasing and magnitude of the flap, yaw and pitch motions, or through combinations of such changes. The ability of the wing-drive mechanism to affect multiple trajectories is an important advantage of this invention, and is a result of employing a wing-drive mechanism that permits the drive wing to move over three independent rotational degrees of freedom. By changing the drive wing trajectory, both the magnitude and the direction of the net force (relative to the fuselage or an inertial frame of reference, or both) created by the drive wing over the course of a beat cycle or series of beat cycles can be varied in a predetermined way.

Flap, yaw and pitch motions are affected by the application of torque to drive wing 101 by each of axis drive mechanisms 103, 111 and 121. To affect a specific drive wing trajectory, each of axis drive mechanisms 103, 111 and 121 apply torque, over the course of a beat cycle, in a predetermined pattern. Generally, the torque applied by each of axis drive mechanisms 103, 111 and 121 changes in a continuous or piecewise continuous manner over the course of beat cycle. To maintain a specific drive wing trajectory, those torque patterns are simply repeated over multiple beat cycles. Changes in drive wing trajectory are affected by altering the pattern of torque that is applied by at least one and possibly two or three of the axis drive mechanisms 103, 111 or 121.

Suitable springs may also be inserted between the drive-axis shafts and the drive-motor fuselage bases to act as inertial energy storage devices and to supplement the mass balance weights. This is shown in The FIGURE at reference numerals 134 and 144. Also, the drive motors may be doubled up by placing motors on either side of the slotted-arc rails. Another pitch control motor may be placed in parallel or in series with the existing pitch control motor. In addition, guide rails 110 and 120 may be doubled up as a fail-safe measure.

In another modification of the embodiment shown in the FIGURE, the relative positions of motor 161 and mass balance 106 may be reversed, so that motor 161 resides between pivot point 104 and guide rails 110 and 120, and mass balance 106 resides so that the guide rails are interposed between mass balance 106 and motor 161. Motor 161 is slotted onto guide rail 110 in such a way that (1) motor 161 can move freely along slot 112, (2) motor 161 is rotationally fixed with respect to guide rail 110, and (3) inwardly extending spar 117 (which forms or is affixed to the shaft of motor 161) can rotate freely with respect to guide rail 110.

In yet other alternatives, mass balance 106 and motor 161 can be placed on the same side of the guide rails, with the motor 161 and mass balance 106 slotted onto guide rail 110 if they are between the guide rails and the pivot point, or the motor 161 and mass balance 106 slotted onto guide rail 120 if the guide rails are between the pivot point and the motor-mass balance combination.

U.S. Pat. No. 6,206,324, U.S. patent application Ser. No. 09/793,333 and PCT/US00/23544all to Michael J. C. Smith and all incorporated herein by reference in their entirety, describe methods for controlling the movement of a wing-drive mechanism having three independent axis drive mechanisms that provide independent movement about flap, yaw and pitch axes. Those methods are entirely suitable for controlling the wing-drive mechanism of this invention. In general, in order to affect a given drive wing trajectory, it is necessary to create a set of coordinated torque patterns that are to be applied by each of the axis drive mechanisms over a course of a beat cycle. Control over the wing-drive mechanism of this invention is exercised by (1) identifying a desired drive wing trajectory and (2) generating and transmitting movement input signals which actuate the respective axis drive mechanisms to supply the appropriate torque sequences to affect the desired drive wing trajectory. Desired wing trajectories can be identified by an automated trajectory specification system (ATSS) as described in the Smith patent and applications mentioned above. The ATSS can specify the trajectory to a controller that computes torques to be applied to each of the first, second and third axis drive mechanisms to effect the desired wing trajectory, again as described in the aforementioned Smith patent and applications.

The controller is preferably one that generates said first, second and third movement input signals by calculating said first, second and third movement input signals in real time using a controlling function that relates a desired drive wing trajectory and an actual drive wing trajectory to torques to be applied by each of said first, second and third axis drive mechanisms. The controller preferably specifies the desired drive wing trajectory and the actual drive wing trajectory as drive wing orientation parameters, drive wing rate of change orientation parameters, drive wing rate of change of rate of change of orientation parameters, or a combination of two or more of these.

The automated trajectory specification system preferably specifies the desired drive wing trajectory and said actual drive wing trajectory to the controller as one or more values representing the difference between said desired drive-wing trajectory and said actual drive wing trajectory. The automated trajectory specification system preferably generates said desired drive wing trajectory by comparing inputted actual and desired data that is selected from the group consisting of vehicle position, velocity, acceleration, orientation, rate of change of orientation, rate of change of rate of change of orientation and combinations of two or more thereof. The automated trajectory specification system preferably includes a fuzzy logic processor or a neural network.

It will be appreciated that many modifications can be made to the wing-drive mechanism as described herein without departing from the spirit of the invention, the scope of which is defined by the appended claims. For example, redundant systems may be employed as a hedge against failure of a particular component.

What is claimed is:

1. A wing-drive mechanism for a vehicle having a fuselage, comprising a) an outwardly extending spar that is rotatable independently in flap, yaw and pitch directions about a pivot point;

b) an inwardly extending spar that is rotatable independently in flap, yaw and pitch directions about the pivot point, c) a drive wing mounted on the outwardly extending spar;

d) a first axis drive mechanism for moving said drive wing about the pivot point in a flap direction in response to a first movement input signal;

e) a second axis drive mechanism for moving said drive wing about the pivot point in a yaw direction in response to a second movement input signal, wherein said second axis drive mechanism operates independently of said first axis drive mechanism; and f) a third axis drive mechanism for adjusting the pitch of said drive wing in response to a third movement input signal, wherein said third axis drive mechanism operates independently of said first and second axis drive mechanisms, wherein at least one of the first and second axis drive mechanisms act on the inwardly extending spar to effect movement of the inwardly extending spar, the outwardly extending spar and the drive wing about the pivot point.

2. The wing-drive mechanism of claim 1 wherein the first axis drive mechanism acts on the inwardly extending spar to effect movement of the inwardly extending spar, the outwardly extending spar and the drive wing about the pivot point.

3. The wing-drive mechanism of claim 1 wherein the second axis drive mechanism acts on the inwardly extending spar to effect movement of the inwardly extending spar, the outwardly extending spar and the drive wing about the pivot point.

4. The wing-drive mechanism of claim 2 wherein the second axis drive mechanism acts on the inwardly extending spar to effect movement of the inwardly extending spar, the outwardly extending spar and the drive wing about the pivot point.

5. The wing-drive mechanism of claim 1 wherein said wing-drive mechanism further comprises a controller that generates said first, second and third movement input signals by calculating said first, second and third movement input signals in real time using a controlling function that relates a desired drive wing trajectory and an actual drive wing trajectory to torques to be applied by each of said first, second and third axis drive mechanisms.

6. The wing-drive mechanism of claim 5, wherein said controller specifies said desired drive wing trajectory and said actual drive wing trajectory as drive wing orientation parameters, drive wing rate of change orientation parameters, drive wing rate of change of rate of change of orientation parameters, or a combination of two or more of these.

7. The wing-drive mechanism of claim 6, wherein said wing-drive mechanism further comprises an automated trajectory specification system that specifies the desired drive wing trajectory and said actual drive wing trajectory to the controller.

8. The wing-drive mechanism of claim 7, wherein said desired drive-wing trajectory and said actual drive wing trajectory are specified to the controller as one or more values representing the difference between said desired drive-wing trajectory and said actual drive wing trajectory.

9. The wing-drive mechanism of claim 7, wherein said automated trajectory specification system generates said desired drive wing trajectory by comparing inputted actual and desired data that is selected from the group consisting of vehicle position, velocity, acceleration, orientation, rate of change of orientation, rate of change of rate of change of orientation and combinations of two or more thereof.

10. The wing-drive mechanism of claim 7 wherein said automated trajectory specification system includes a fuzzy logic processor or a neural network.

11. The wing drive mechanism of claim 4 wherein the inwardly extending spar is inserted through a slot of a first slotted arc in said first axis drive mechanism, said first slotted arc being rotatable about said flap axis, such that rotation of said first slotted arc about said flap axis imparts a flap motion to said drive wing.

12. The wing-drive mechanism of claim 11, wherein the inwardly extending spar is inserted through a slot of a second slotted arc in said second axis drive mechanism, said second slotted arc being rotatable about said yaw axis, such that rotation of said second slotted arc about said yaw axis imparts a yaw motion to said drive wing.

* * * * *